(12) United States Patent
Hosamani et al.

(10) Patent No.: US 10,914,512 B1
(45) Date of Patent: Feb. 9, 2021

(54) HOME APPLIANCE DEVICE AND METHOD OF ASSEMBLING THE HOME APPLIANCE DEVICE

(71) Applicant: BSH HAUSGERAETE GMBH, Munich (DE)

(72) Inventors: Prashantagouda Hosamani, Ulm (DE); Robert Stahl, Herbrechtingen (DE)

(73) Assignee: BSH Hausgeraete GmbH, Munich (DE)

( * ) Notice: Subject to any disclaimer, the term of this patent is extended or adjusted under 35 U.S.C. 154(b) by 0 days.

(21) Appl. No.: 16/660,072

(22) Filed: Oct. 22, 2019

(51) Int. Cl.
*F25D 23/08* (2006.01)

(52) U.S. Cl.
CPC ........ *F25D 23/087* (2013.01); *F25D 2201/12* (2013.01)

(58) Field of Classification Search
CPC ...... F25D 23/087; F25D 23/006; F25D 23/06; F25D 23/062; F25D 23/063; F25D 23/064; F25D 23/065; F25D 23/066; F25D 23/067; F25D 23/069
See application file for complete search history.

(56) References Cited

U.S. PATENT DOCUMENTS

| | | | | |
|---|---|---|---|---|
| 3,872,688 A | * | 3/1975 | Tillman | F25D 23/069 62/329 |
| 4,213,309 A | * | 7/1980 | Pifer | F25D 11/00 62/332 |
| 6,341,830 B1 | * | 1/2002 | Chun | F25D 23/063 312/263 |
| 8,845,047 B2 | * | 9/2014 | Luisi | F25D 23/069 312/407 |
| 9,429,357 B2 | * | 8/2016 | Cha | B23P 15/26 |
| 2009/0013710 A1 | * | 1/2009 | Cho | F25D 23/069 62/285 |
| 2013/0263620 A1 | * | 10/2013 | An | F25D 23/064 62/340 |
| 2018/0087818 A1 | * | 3/2018 | Hosamani | F25D 23/066 |
| 2018/0087826 A1 | * | 3/2018 | Hosamani | F25C 5/22 |
| 2020/0166271 A1 | * | 5/2020 | Hosamani | F25D 23/066 |
| 2020/0200466 A1 | * | 6/2020 | Hwang | F25D 11/02 |

* cited by examiner

*Primary Examiner* — Daniel J Rohrhoff
(74) *Attorney, Agent, or Firm* — Laurence A. Greenberg; Werner H. Stemer; Ralph E. Locher

(57) ABSTRACT

For improving the energy efficiency of a home appliance device, in particular a home refrigeration appliance device, the appliance device has at least one inner liner defining at least one storage space, at least one functional unit which is in an assembled state is connected to the inner liner and is located in the storage space, and at least one seal which is in the assembled state compressed between at least one mating surface of the functional unit and the inner liner. The inner liner has at least one protrusion, which the seal abuts on in the assembled state.

17 Claims, 12 Drawing Sheets

HOME APPLIANCE DEVICE AND METHOD OF ASSEMBLING THE HOME APPLIANCE DEVICE

BACKGROUND OF THE INVENTION

Field of the Invention

The invention relates to a home appliance device, in particular a home refrigeration appliance device, according to the independent device claim and to a method for an assembly of the home appliance device according to the independent method.

From the prior art a refrigerator is known containing an ice-preparation chamber that is firmly attached to an inner liner in a foaming process of the inner liner, such that a seal is compressed between the ice-preparation chamber and the inner liner. Such an implementation involves a high risk of the seal being excessively compressed, resulting in leakages and a loss of a sealing function.

SUMMARY OF THE INVENTION

An objective of the invention is, in particular, to provide a home appliance device with improved characteristics regarding energy efficiency. The objective is achieved, according to the invention, by the features of the independent claims, while advantageous implementations and further developments of the invention may be gathered from the dependent claims.

In one aspect of the invention, which may in particular be considered in combination with as well as separately from other aspects of the invention, a home appliance device, in particular a home refrigeration appliance device, is proposed, containing: at least one inner liner defining at least one storage space; at least one functional unit which is in an assembled state connected to the inner liner and is located in the storage space; and at least one seal which is in the assembled state compressed between at least one mating surface of the functional unit and the inner liner. The inner liner contains at least one protrusion, which the seal abuts on in the assembled state. By means of this aspect of the invention, in particular an energy efficiency of the home appliance device can be improved. Advantageously a high durability of the home appliance device, in particular a high durability of the at least one seal, can be achieved. Moreover, a design of the home appliance may be improved.

In another aspect of the invention, which may in particular be considered in combination with as well as separately from other aspects of the invention, a home appliance device, in particular a home refrigeration appliance device, is proposed, containing: at least one inner liner defining at least one storage space; and at least one functional unit which is in an assembled state connected to the inner liner and is located in the storage space. The inner liner contains at least one accommodation element, which in the assembled state at least partly accommodates the at least one functional unit. By means of this aspect of the invention, in particular an assembly can be improved. In particular, a quick and/or cheap and/or easy assembly of a home appliance device is facilitated. Advantageously a high durability can be achieved. Furthermore, a design of the home appliance device may be improved.

In yet another aspect of the invention, which may in particular be considered in combination with as well as separately from other aspects of the invention, a home appliance device, in particular a home refrigeration appliance device, is proposed, containing: in particular at least one inner liner defining at least one storage space; and at least one functional unit, which is embodied as a partitioning unit for partitioning at least one storage space into at least two subspaces in an assembled state and which is in particular connected to the inner liner in an assembled state. The partitioning unit contains at least one thermal insulation inlay element and at least one protective foil, wherein the at least one thermal insulation inlay element is enclosed by the protective foil. By means of this aspect of the invention, energy efficiency can be improved. Further a durability of the home appliance device can be improved. In particular the thermal insulation inlay element can be protected from water and/or moisture. Thus, a risk of damage to the thermal insulation inlay element can be reduced, advantageously minimized. A further advantage is that an emission of unwanted odors occurring during a production process, in particular during a foaming process, of the thermal insulation inlay element can be prevented. Furthermore, an improved handling of the thermal insulation inlay element during assembly is achievable.

A "home appliance device" is in particular to mean at least a portion, preferably a sub-assembly group, of a home appliance. The home appliance is in particular provided for storing and preferably tempering victuals such as beverages, meat, fish, vegetables, fruits, milk and/or dairy products in at least one operative state, advantageously for the purpose of enhancing a keepability of the stored victuals. Advantageously, the home appliance is embodied as a home refrigeration appliance, which is in at least one operative state configured for cooling victuals. The home refrigeration appliance could in particular be embodied as a climate cabinet, an ice-box, a refrigerator, a freezer, a refrigerator-freezer combination and/or a wine cooler. However, the home appliance could also be embodied as a home appliance for warming up and in particular for cooking victuals, e.g. an oven, a steamer and/or a microwave. In this context, "configured" is in particular to mean specifically designed and/or equipped. By an object being configured for a certain function is in particular to be understood that the object implements and/or fulfills said certain function in at least one application state and/or operative state.

The home appliance device may comprise at least one outer liner. In particular, the inner liner may be arranged inside the outer liner. In particular, there may be a gap between the inner liner and the outer liner, which may in particular filled with foam, for instance with Polyurethane foam. During assembly, the inner liner may advantageously be placed inside the outer liner and the gap may subsequently be filled with foam during foaming. In particular, the inner liner and the outer liner together may form a main housing of the home appliance device. The inner liner may in particular define the at least one storage space of the home appliance device. The at least one storage space in particular may be divided into at least two subspaces. The inner liner may in particular be implemented of one piece, in particular by a thermo-forming process. The inner liner in particular has at least a first wall and at least a second wall. In the assembled state the first wall of the inner liner and the second wall of the inner liner differ from each other at least in a position, in particular in a position relative to each other and/or in a position relative to a main extension direction of the home appliance device. A "main extension direction" of an object is, in particular, to be understood, in this context, as a direction extending in parallel to a largest side of an imaginary rectangular cuboid which only just entirely encloses the object. The first wall and the second wall of the inner liner share at least one common edge. An "edge" is in particular to mean, in this context, a line where an object or a region of an object begins or ends. In this context, a "common edge" shared by the first wall and the second wall means a line where the first wall of the inner liner ends and the second wall of the inner liner begins. The common edge may in particular, in this context, define a transition from the first wall of the inner liner to the second wall of the inner liner. The inner liner may in particular comprise at least one rear wall, at least one top wall, at least one bottom wall and at least two side walls. The rear wall and the two side walls may in particular be oriented vertically. The two side walls may in particular be aligned in parallel to each other. The top wall and the bottom wall may in particular be aligned in parallel to each other. The top wall and the bottom wall may in particular be oriented horizontally. In this context, "vertically" is in particular to mean perpendicularly to a floor, on which the home appliance device stands in at least one normal operation condition. In this context, "horizontally" is in particular to mean parallel to a floor on which the home appliance device stands in at least one normal operative state. In a similar way, terms like "top", "bottom", "lateral", "rear", "front", "side" are in particular to mean with reference to the normal operative state. The at least one functional unit of the home appliance device may in particular be configured to fulfill at least one function of the home appliance in at least one operative state of the home appliance device. The home appliance device may in particular comprise several functional units. The home appliance device may comprise a first functional unit, which is configured to fulfill a first function of the home appliance in the at least one operative state, and a second functional unit, which is configured to fulfill a second function in the at least one operative state of the home appliance, wherein the second function differs from the first function. For instance, it is conceivable that a first function of the first functional unit is to partition the storage space defined by the inner liner of the home appliance device into at least two subspaces, in particular into at two least thermally separated subspaces, and the second function of the second functional unit may be a cooling function and/or a freezing function and/or a ventilation function and/or another function of the home appliance device. It is further conceivable that the first and the second functional units may have in an operative state the same and/or a similar and/or a related function. For instance, the first functional unit may partition the storage space into two subspaces, with the second functional unit further partitioning at least one of the resulting subspaces. Another exemplary possibility would be that a first functional unit is configured for a cooling of a first sector of the home appliance device and the second functional unit is configured for a cooling of a second sector of the home appliance device. The seal may in particular be configured to provide at least one mechanical seal between at least two connected objects. In particular, in the assembled state the seal may be configured to fill at least one space between at least two connected objects in order to reduce and/or prevent a heat exchange through the space of the at least two joined objects. As an alternative or in addition, the at least one seal may in particular be configured to prevent a leakage of at least one fluid, in particular of water and/or air, in particular through said space between the at least two joined objects. The seal may be made of plastic, in particular of a synthetic polymer, advantageously of silicone. It is also conceivable that the at least one seal may be made of another material/other materials, such as metal and/or paper and/or rubber and/or cork and/or felt and/or neoprene and/or fiberglass and/or polytetrafluorethylene and/or another material, deemed expedient for providing a sealing function by a person having ordinary skill in the art. The at least one protrusion of the inner liner in particular protrudes towards the at least one storage space of the inner liner. The at least one accommodation element may in particular form a geometrical shape of at least one inner liner wall of the inner liner.

In an advantageous implementation of the invention it is proposed that the functional unit is embodied as a partitioning unit that partitions the storage space into at least two subspaces in the assembled state. On account of this, in particular a user convenience can be improved. The partitioning unit may in particular comprise at least two partitioning walls. The at least two partitioning walls may in particular be arranged including an angle with each other. In particular, it is conceivable that the partitioning unit is configured as a thermal barrier between at least one first subspace of the at least two subspaces of the storage space and at least one second subspace of the at least two subspaces of the storage space. For instance, the at least one first subspace could be configured as a first storage chamber for storing victuals at a designated first temperature, while the at least one second subspace could for example be designed as a second storage chamber for storing victuals at a second temperature that differs from the first temperature. In particular, it is conceivable that the first subspace is embodied as an ice-preparation chamber. As an alternative or in addition, it is proposed that the functional unit is a cooling unit, in particular a no-frost cooling unit, in particular for reducing humidity inside the storage space.

Further, it is proposed that the at least one protrusion is located at an edge of the inner liner. In this way a sealing function of the at least one seal, in particular at an edge of the inner liner, can be improved.

The at least one protrusion may be formed separately from an inner liner wall. It is conceivable that the at least one protrusion may be attached to an inner liner wall of the inner liner, for instance by a form-fit and/or a force-fit connection. However, in particular for the purpose of improving a production process of the home appliance device, it is proposed that the at least one protrusion is implemented integrally with an inner liner wall of the inner liner, in particular by a thermo-forming process. On account of this, advantageously a number of parts to be produced can be reduced and thus a production process can be improved. In this context "implemented integrally" is in particular to mean connected at least by substance-to-substance bond, e.g. by a welding process, an adhesive bonding, an injection-molding process, preferably a thermo-forming process, and/or by another process that is deemed expedient by a person having ordinary skill in the art. In particular, "implemented integrally" could in particular mean made of one piece. "Made of one piece" is, in particular, to mean, in this context, manufactured from one single piece, e.g. by production from one single cast, and/or by manufacturing in a one-component or multi-component injection-molding process, and for example from a single blank.

Further, it is proposed that the functional unit compresses the seal with an evenly distributed pressure force in the assembled state. On account of this, a sealing function of the seal may be improved. The term an "evenly distributed pressure force" is in particular to mean, in this context, that a pressure force is at least substantially spread equally across at least one sealing surface against which the seal is compressed. In this context, by the term "at least substantially" is in particular to be understood that a first value of a pressure force compressing at least a portion of the seal against a first section of the sealing surface differs from a second value of a pressure force compressing at least a second portion of the seal against a second section of the sealing surface, in particular by less than 25%, preferably by less than 10% and advantageously by less than 5%. In addition, it is proposed that a geometrical shape of the inner liner and/or of the mating surface of the functional unit delimits a degree of compression of the seal within a defined range in the assembled state. The defined range of compression in particular ranges from 25% to 75%, preferably from 35% to 65% and advantageously from 40% to 50% of a maximally possible compression of the seal. As a result of this, advantageously an excess of compression of the at least one seal can be prevented and thus a risk of damaging the seal can be reduced, while at the same time a particularly safe and/or particularly reliable sealing function of the at least one seal is facilitated.

Moreover, it is proposed that the at least one protrusion contains at least one abutment surface for an abutment of the seal, the at least one abutment surface defining a bending radius for the seal which is greater than a bending radius of an edge region of the inner liner. In this way in particular a sealing function of the seal can be improved. In particular, a smooth bending of the seal and hence a reduced risk of damaging the seal can be achieved. By the term "abutment surface" is, in particular, a surface to be understood, in this context, which directly receives a thrust or pressure. By a "bending radius" is, in particular, to be understood, in this context, a radius of a circular arc which best approximates a curve of a bent object. An "edge region" is, in particular, in this context, to mean an area of the inner liner containing at least a section of an edge of the first wall and/or of the second wall of the inner liner. In addition, the edge region may in particular comprise at least one section of the first wall and/or at least one section of the second wall of the inner liner, wherein the section of the first wall and/or the section of the second wall may be seen as partially belonging to the edge region and may in particular extend from the section of the edge of the edge region in a main extension direction of the first wall and/or of the second wall of the inner liner. The section/sections of the first wall and/or the second wall belonging to the edge region may in particular amount to up to 10% of the main extension of the first wall and/or of the second wall of the inner liner. According to an advantageous implementation of the invention, the at least one protrusion is located at an edge region of the inner liner and extends from a first inner liner wall of the inner liner to a second inner liner wall of the inner liner. Advantageously, it is proposed that the first inner liner wall is a rear wall of the inner liner. It is conceivable that the second inner liner wall is a side wall of the inner liner. As an alternative or in addition, it is conceivable that the second inner liner wall is a top wall of the inner liner. Alternatively, the second inner liner wall may be a bottom wall of the inner liner. On account of this, in particular a sealing in the edge region can be improved and in particular a smooth transition of the inner liner from the first wall to the second wall may be made possible.

It is conceivable that the functional unit is firmly connected with the inner liner, in particular by a cohesive connection, for instance by an adhesive bond. However, advantageously, it is proposed that the functional unit is detachably connected with the inner liner. On account of this, an easy disassembly of the functional unit, in particular for maintenance purposes, can be facilitated. In particular, the functional unit may be connected with the inner liner at least by a form-fit connection and/or at least a force-fit connection, in particular by at least a bolted connection. As an alternative or in addition, it is also conceivable that the functional unit is connected to the inner liner at least by a latch connection.

Moreover, it is proposed that the at least one seal is mounted on the functional unit by means of a latch mechanism. In this way in particular a quick and/or precise fitting and/or an easy assembly and/or an easy disassembly of the at least one seal are/is achievable. As an alternative or in addition, it is conceivable that the seal is mounted on the functional unit by a cohesive connection, for instance by an adhesive bond.

Further, a method for an assembly of a home appliance device, in particular a home refrigeration appliance device, is proposed, containing: a step of mounting at least one seal to at least one functional unit; a step of inserting the at least one functional unit into a storage space of an inner liner; a step of pressing the functional unit towards the inner liner, thereby compressing the seal between at least one mating surface of the functional unit and the inner liner in such a way that the seal abuts on at least one protrusion of the inner liner; and a step of connecting the functional unit to the inner liner. On account of this, in particular a precise assembly of the seal, resulting in a proper sealing function, can be facilitated.

In addition, it is proposed that the accommodation element accommodates the at least one functional unit at least partly in a form-fit manner in the assembled state. As a result of this, in particular an exact and/or easy assembly of the functional unit can be facilitated. In particular, an assembly without the need of further assembling elements can be facilitated. Thus, in particular a number of parts to be produced is reducible and thus a production process can be improved.

Moreover, it is proposed that the accommodation element contains a channel, in which at least a portion of the functional unit is located in the assembled state. On account of this, in particular a weight-force of the functional unit can be partly absorbed by the accommodation element in a simple manner. Furthermore, it is proposed that the accommodation element contains a plateau portion, in which the channel is formed. Thereby, it is advantageously possible to further improve a force transmission of the weight-force of the functional unit to the inner liner.

It is also proposed that the at least one accommodation element is implemented integrally with an inner liner wall of the inner liner, in particular by a thermo-forming process. The at least one accommodation element may in particular be implemented integrally with the first wall of the inner liner. As an alternative or in addition, the at least one accommodation element may be implemented integrally with the second inner liner wall of the inner liner and/or with a further inner liner wall of the inner liner. On account of this, advantageously a number of parts to be produced can be reduced and thus a production process can be improved. In addition, it is proposed that the accommodation element is located at a rear wall of the inner liner. As a result, in particular an easy assembly of the at least one functional unit at the accommodation element can be facilitated. However, it is also conceivable that the accommodation element is located at a side wall and/or at a top wall and/or at a bottom wall of the inner liner. In particular, the at least one accommodation element may extend from the first wall of the inner liner at least to the second wall of the inner liner. For instance, the accommodation element may extend from the rear wall of the inner liner to at least one of the side walls of the inner liner.

In addition, it is proposed that the at least one accommodation element and the at least one functional unit form at least one gap containing a stationary air cushion in the assembled state. The at least one accommodation element and the at least one functional unit may in particular form a cascading gap in the assembled state, the cascading gap may in particular have several steps, which may in particular be arranged perpendicularly to each other, such that the cascading gap may in particular have a maze-like cross section. The stationary air cushion may in particular act as a thermal insulator, thereby forming a thermal barrier. The stationary air cushion may in particular supplement a thermal insulation of the at least one seal. Thereby the stationary air cushion may in particular act as an additional thermal barrier. However, it is also conceivable that a thermal insulation between the functional unit and the accommodation element may be provided only by means of the stationary air cushion, without the use of a seal.

Moreover, it is proposed that the inner liner comprises at least one drip edge allowing water detachment from an inner liner wall of the inner liner. The at least one drip edge is in particular located inside one of the at least two subspaces of the storage space of the inner liner. On account of this, it is in particular possible to control a formation of condensation water during an operation of the home appliance device. In particular, condensation water can accumulate on the drip edge, after accumulation the condensation water can drip back from the drip edge into the subspace of the storage space of the inner liner. As a result of this, advantageously condensation water can be retained inside the at least one subspace of the storage space of the inner liner. Thus, a comfort for a user can be enhanced. Additionally, it is proposed that the functional unit abuts on the drip edge in the assembled state. Thereby in particular a design of the home appliance device can be improved. Furthermore, it is proposed that the drip edge is located at a side wall of the inner liner. As a result of this, in particular a formation of condensation water in an area of the side wall can be controlled. In particular, condensation water forming in the region of the side wall, which otherwise may would flow down the side wall, can be collected at the drip edge and be retained inside the at least one subspace of the inner liner. As a result, in particular a comfort for a user can be improved.

Furthermore, a method for an assembly of a home appliance device, in particular a home appliance refrigeration device, is proposed, containing: a step of inserting at least one functional unit into at least one storage space of an inner liner; a step of accommodating the functional unit in at least one accommodation element of the inner liner; and a step of connecting the functional unit to the inner liner. On account of this, in particular, an easy and/or safe and/or reliable assembly of the home appliance device is achievable.

In addition, it is proposed that the thermal insulation inlay element is enclosed watertightly by the protective foil. By the term "watertightly" is in particular to be understood that an object is closely sealed and non-perforated so that no water and/or moisture passes towards and/or inside the object. On account of this, in particular wear and/or tear of the thermal insulation inlay element, resulting from water or moisture penetrating the thermal insulation inlay element, can be prevented. In particular, a high degree of durability of the thermal insulation inlay element can be facilitated. Hence advantageously a particularly reliable and particularly safe thermal insulation can be provided.

Furthermore, it is proposed that the thermal insulation inlay element contains, in particular consists of, a foamed plastic, in particular polyurethane. On account of this, in particular a quick and/or easy production of the thermal insulation inlay element can be facilitated. In addition, a reasonably priced thermal insulation element can be provided.

Moreover, it is proposed that the protective foil contains, in particular consists of, a synthetic material, in particular polyethylene. As a result of this, in particular a high flexibility of the protective foil can be facilitated. However, it is also conceivable that the protective foil may comprise and/or may consist of another material such as a metal, e.g. aluminum.

In addition, it is proposed that the partitioning unit contains at least two co-operating housing elements, the at least two co-operating housing elements in combination forming an outer housing of the partitioning unit. Furthermore, it is proposed that at least one of the at least two co-operating housing elements has an outer shape comprising at least one bend. On account of this, in particular the outer shape of the partitioning unit can be easily adjusted to individual requirements. For instance, the outer shape of the partitioning unit may in particular be adapted for a partitioning of the at least one storage space of the inner liner into at least one small subspace located in a corner region of the inner liner and into at least one bigger subspace. In addition, in particular for the purpose of improving energy efficiency, it is proposed that the thermal insulation inlay element is arranged between the two co-operating housing elements. The thermal insulation inlay element may in particular be completely enclosed by the two co-operating housing elements. As a result of this, advantageously a design of the partitioning unit can be improved. Moreover, it is proposed that an outer shape of the thermal insulation inlay element adopts an inner shape of at least one of the at least two co-operating housing elements. In particular, the thermal insulation inlay element may be implemented of one piece. On account of this, an at least substantially uniform thermal insulation across the entire surface area of the partitioning unit can be facilitated. Furthermore, it is proposed that an outer shape of the thermal insulation inlay element contains at least one bend. As a result of this, a reliable thermal insulation can be facilitated.

Further, a method of manufacturing a home appliance device, in a particular a home refrigeration appliance device, is proposed. The home appliance device in particular contains at least one inner liner defining at least one storage space and at least one functional unit, which is embodied as a partitioning unit for partitioning at least one storage space into at least two subspaces in an assembled state and which is in particular connected to the inner liner in an assembled state. The partitioning unit includes at least one thermal insulation inlay element and at least one protective foil. The method contains a step of enclosing the at least one thermal insulation inlay element by the protective foil. In a further implementation it is proposed that the step of enclosing the thermal insulation inlay element contains: a partial step of placing at least a portion of the protective foil onto an inner surface of a foaming-mold, a partial step of producing the thermal insulation inlay element by filling the foaming-mold with a foam, a partial step of a hardening of the foam inside the foaming-mold, a partial step of removing the thermal insulation inlay element surrounded with the protective foil out of the foaming-mold and a partial step of sealing the protective foil around the thermal insulation inlay element. On account of this, in particular a reliable method of manufacturing a home appliance device containing at least one thermal insulation element can be facilitated, providing a thermal insulation with a particularly reliable protection.

As an alternative implementation of the above-mentioned method, it is proposed that the step of enclosing the thermal insulation inlay element contains a partial step of producing a protective foil bag, a partial step of placing the protective foil bag inside a foaming-mold, a partial step of producing the thermal insulation inlay element by filling the protective foil bag inside the foaming-mold with a foam, a partial step of a hardening of the foam, a partial step of removing the thermal insulation inlay element out of the foaming-mold and a partial step of sealing the protective foil bag. In this way, in particular an easy and/or reliable method of manufacturing a home appliance device containing at least one thermal insulation element can be facilitated, providing a thermal insulation with in an in particular reliable protection.

Herein the home appliance device is not to be limited to the application and implementation described above. In particular, for the purpose of fulfilling a functionality herein described, the home appliance device may comprise a number of respective elements, structural components and units that differs from the number mentioned herein. Furthermore, regarding the value ranges mentioned in this disclosure, values within the limits mentioned are to be understood to be also disclosed and to be used as applicable.

Further advantages may become apparent from the following description of the drawing. In the drawing an exemplary embodiment of the invention is shown. The drawing, the description and the claims contain a plurality of features in combination. Someone having ordinary skill in the art will purposefully also considers the features separately and will find further expedient combinations.

If there is more than one specimen of a certain object, only one of these is given a reference numeral in the figures and in the description. The description of this specimen may be correspondingly transferred to the other specimens of the object.

Other features which are considered as characteristic for the invention are set forth in the appended claims.

Although the invention is illustrated and described herein as embodied in a home appliance device and a method of assembling the home appliance device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
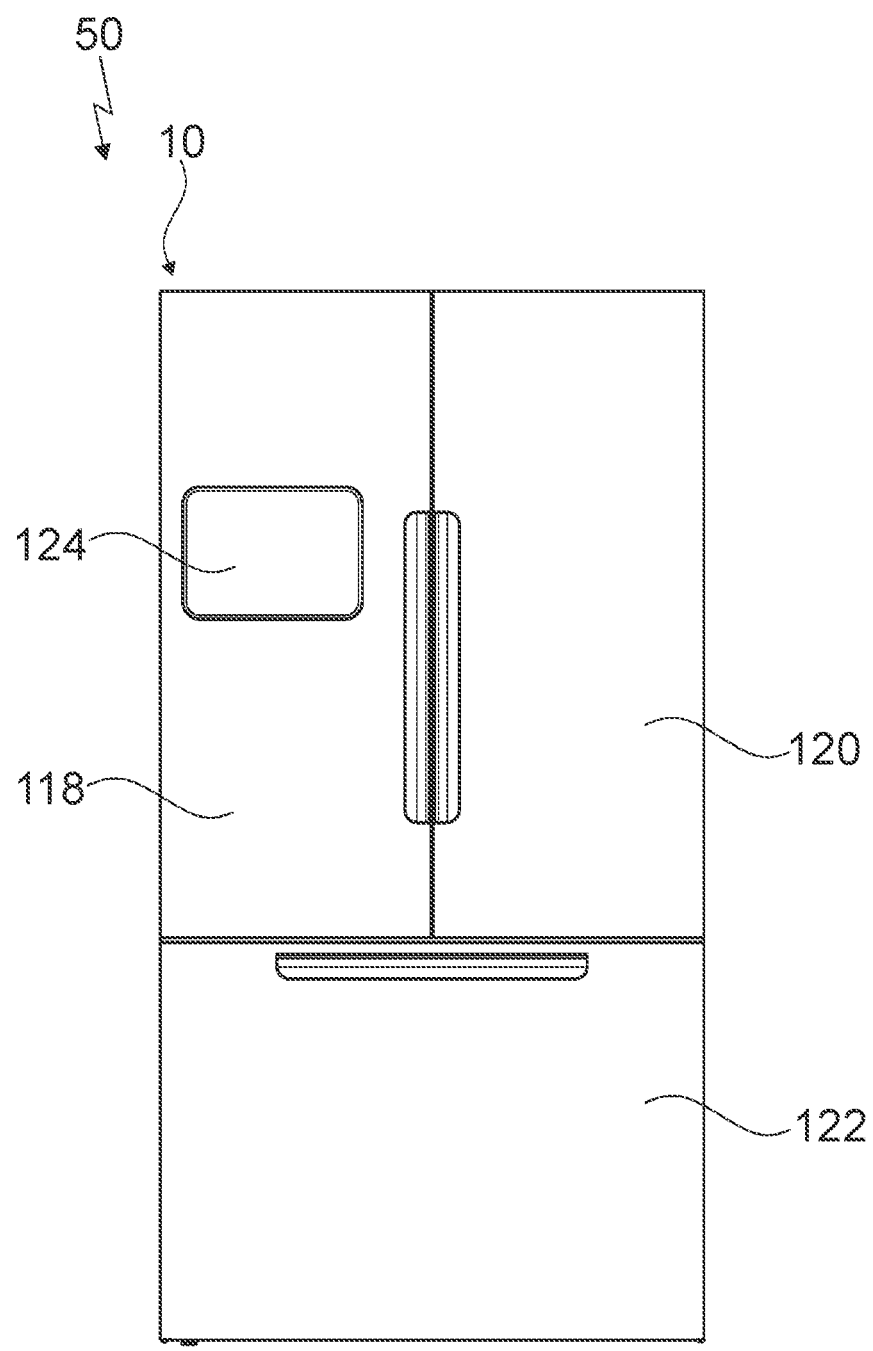
FIG. 1 is a diagrammatic, front view of a home appliance having a home appliance device according to the invention.

Referring now to the figures of the drawings in detail and first, particularly to FIG. 1 thereof, there is shown a home appliance 50 having a home appliance device 10 in a perspective view. The home appliance 50 is a home refrigeration appliance. The home appliance device 10 is a home refrigeration appliance device. In the case shown the home appliance 50 is a refrigerator. The home appliance 50 contains a left upper door 118 and a right upper door 120. The upper doors 118, 120 are French doors and are arranged side by side. The door 118 contains an ice and/or water dispenser 124. The home appliance contains a lower door 122. The lower door 122 covers a freezer compartment. However, other home appliances are conceivable, as has been mentioned above.

Figure 2:
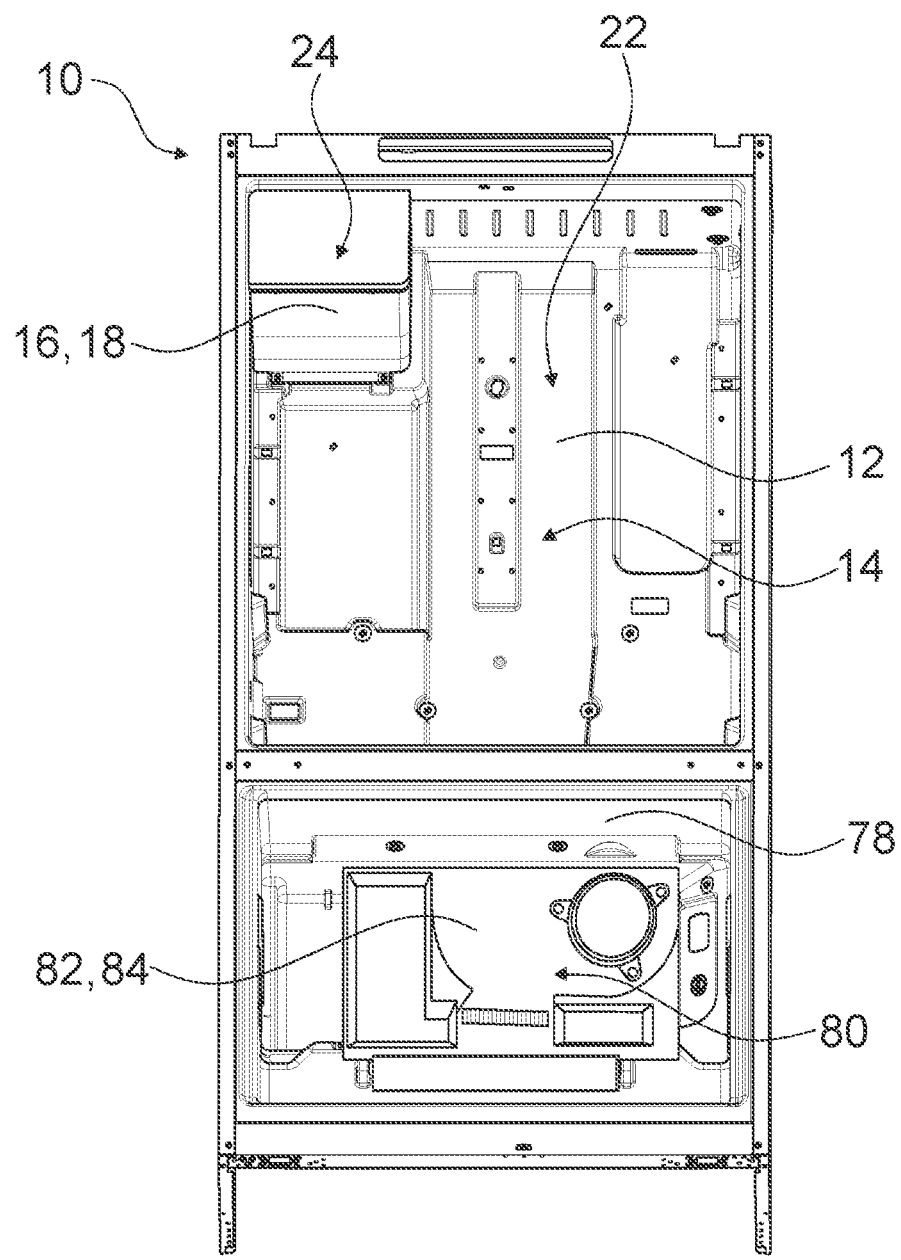
FIG. 2 is an illustration of the home appliance device having an inner liner and a functional unit.

FIG. 2 shows the home appliance device 10 in an assembled state. The home appliance device 10 contains an inner liner 12. The inner liner 12 defines a storage space 14. The home appliance device 10 contains a functional unit 16. The functional unit 16 is connected to the inner liner 12. The functional unit 16 is located in the storage space 14. The functional unit 16 is detachably connected to the inner liner 12. In the case shown the functional unit 16 is embodied as a partitioning unit 18. The partitioning unit 18 partitions the storage space 14 into a first subspace 22 and a second subspace 24. In the case shown the first subspace 22 is embodied as a cooling chamber for storing victuals and the second subspace 24 is embodied as an ice-preparation chamber for producing ice. The home appliance device 10 includes an inner liner 78. The inner liner 78 defines a storage space 80. The storage space 80 is embodied as a freezer compartment. The home appliance device has a functional unit 82. The functional unit 82 is connected to the inner liner 12. The functional unit 82 is located in the storage space 80. The functional unit 82 is embodied as a cooling unit 84. The cooling unit 84 is in particular embodied as a no-frost cooling unit configured for cooling the storage space 80 at low humidity and for preventing a formation of frost. The home appliance device contains a seal 20 (compare FIG. 6). In the assembled state the seal 20 is compressed between a mating surface 30 (compare FIG. 9D) of the functional unit 16 and the inner liner 12.

Figure 3:
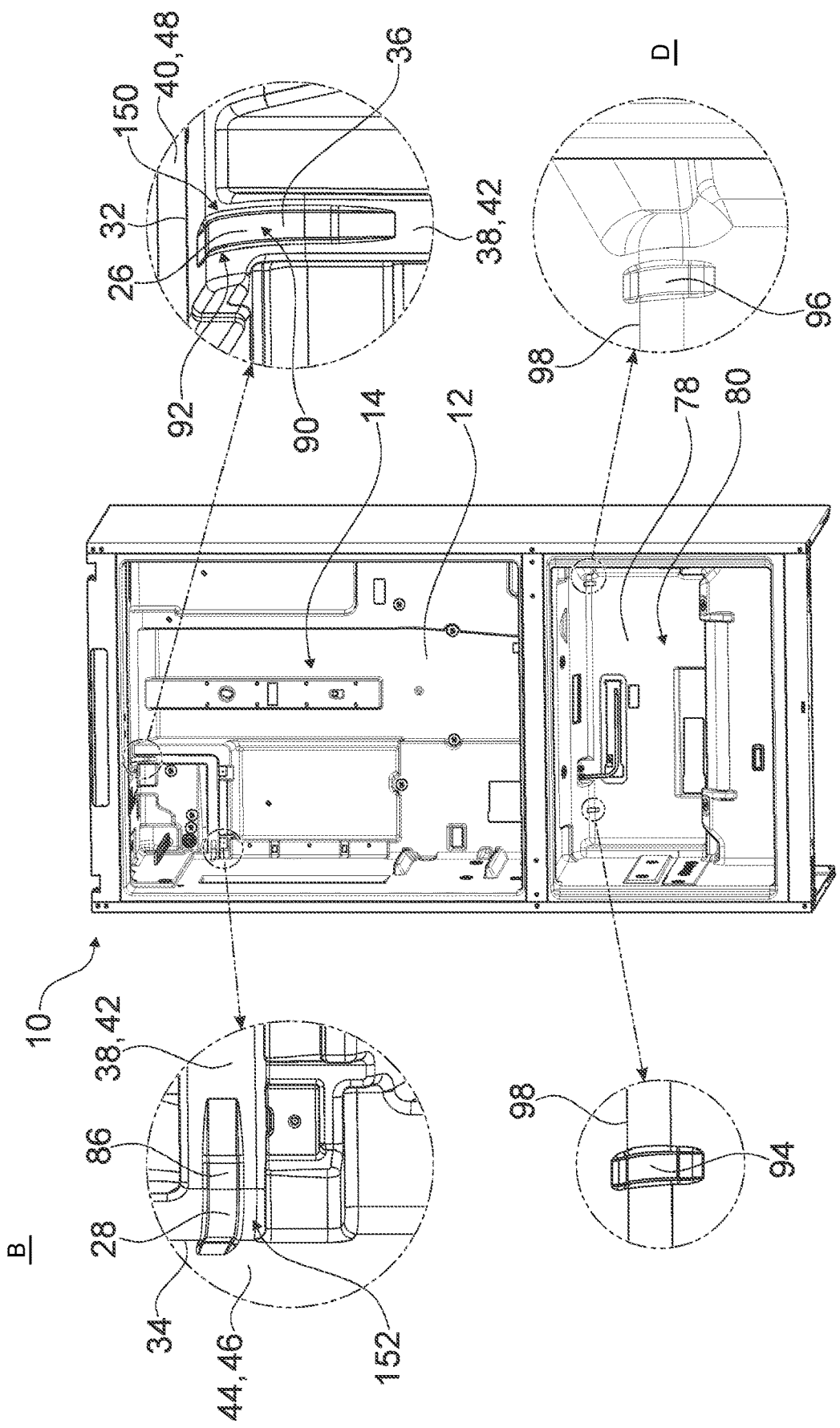
FIG. 3 is an illustration of the home appliance device having several protrusions shown in various enlarged views.

In FIG. 3 the home appliance device 10 is shown in a pre-assembled state without the functional unit 16 and without the functional unit 82. An enlarged view, shows a portion of the storage space 14 defined by the inner liner 12, illustrating that the inner liner 12 has a protrusion 26. The protrusion 26 is implemented integrally with the inner liner 12 by a thermo-forming process. The protrusion 26 is located at an edge 32 of the inner liner 12. The protrusion 26 is located in an edge region 150 of the edge 32 of the inner liner 12. The protrusion 26 extends from a first inner liner wall 38 of the inner liner 12 to a second inner liner wall 40 of the inner liner 12. The first inner liner wall 38 of the inner liner 12 is a rear wall 42 of the inner liner 12. The second inner liner wall 40 of the inner liner 12 is a top wall 48 of the inner liner 12. The protrusion 26 contains an abutment surface 36. In the assembled state (compare FIG. 2) the seal 20 abuts on the abutment surface 36. The abutment surface 36 defines a bending radius 90 for the seal 20. The bending radius 90 is greater than a bending radius 92 of the inner liner 12. In another enlarged view, designated with the letter B, another section of the storage space 14 is shown, illustrating that the inner liner 12 has a protrusion 28. The protrusion 28 is implemented integrally with the inner liner 12 by a thermo-forming process. The protrusion 28 is located at an edge 34 of the inner liner 12. The protrusion 28 is located at an edge region 152 of the edge 34 of the inner liner 12. The protrusion 28 extends from the first inner liner wall 38 of the inner liner 12 to a second inner liner wall 44 of the inner liner 12. The second inner liner wall 44 of the inner liner 12 is a side wall 46 of the inner liner 12. The protrusion 28 contains an abutment surface 86. In the assembled state (compare FIG. 2) the seal 20 abuts on the abutment surface 36. The protrusion 28 is located in an edge region 42 of the inner liner 12. A further enlarged view, shows a portion of the storage space 80 defined by the inner liner 78, illustrating that the inner liner 78 containing a protrusion 94. The protrusion 94 is implemented integrally with the inner liner 78 by a thermo-forming process. The protrusion 94 is located at an edge 98 of the inner liner 78. A further enlarged view, designated with the letter D, showing another section of the storage space 80 defined by the inner liner 78, illustrating that the inner liner 78 containing a protrusion 96. The protrusion 96 is implemented integrally with the inner liner 78 by a thermo-forming process. The protrusion 96 is located at an edge 98 of the inner liner 78.

Figure 4A:
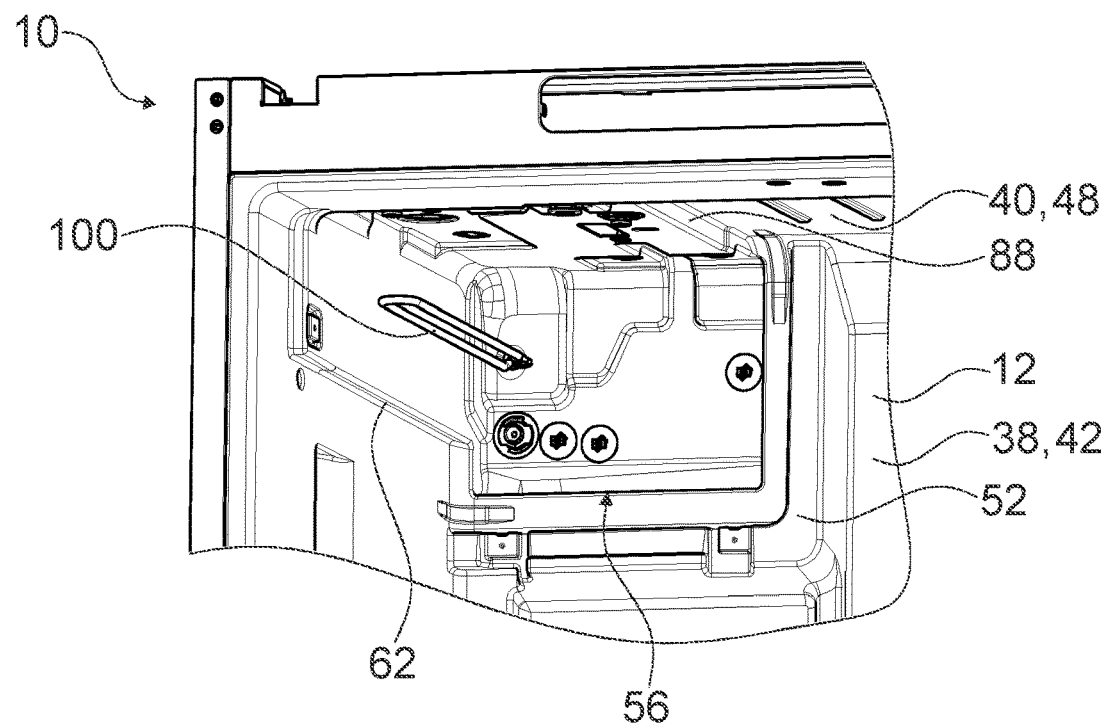
FIG. 4A is a perspective view of a portion of the home appliance device having an accommodation element.
Figure 4B:
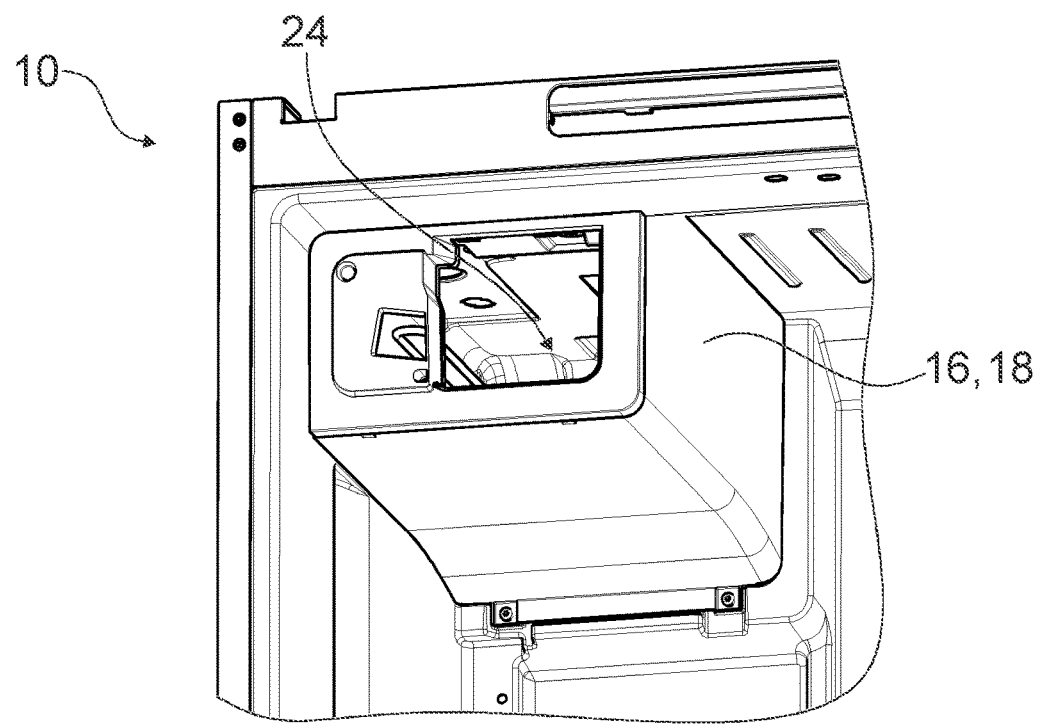
FIG. 4B is a perspective view of a portion of the home appliance device, with the functional unit in an assembled state.

FIG. 4A shows another illustration of the home appliance 10 in a pre-assembled state. The inner liner 12 contains an accommodation element 52. In the case shown the accommodation element 52 is implemented integrally with the first inner liner wall 38 of the inner liner 12 by a thermo-forming process. The first inner liner wall 38 of the inner liner 12 is the rear wall 42 of the inner liner 12. The accommodation element 52 is located at the rear wall 42 of the inner liner 12. The accommodation element 52 is implemented integrally with the rear wall 42. The accommodation element 52 has a channel 54. The accommodation element 52 has a plateau portion 56. The channel 54 is formed in the plateau portion 56. The inner liner 12 contains a drip edge 62. The drip edge 62 is located at the side wall 46 of the inner liner 12. The drip edge 62 allows water detachment from the side wall 46 of the inner liner 12. The home appliance device contains a coolant pipe 100. FIG. 4B shows the home appliance 10 in the assembled state with the functional unit 16 connected to the inner liner 12. In the assembled state the coolant pipe 100 is located in the second subspace 24. The coolant pipe 100 is configured to cool down the second subspace 24 in an operative state of the home appliance device 10. In the assembled state the accommodation element 52 partly accommodates the functional unit 16. The accommodation element 52 partly accommodates the functional unit 52 in a form-fit manner (compare FIG. 8). In the assembled state a portion of the functional unit 16 is located in the channel 54. In an operative state of the home appliance device 10 condensation water (not shown) is kept inside the second subspace 24 by means of the drip edge 62. The drip edge 62 is configured to accumulate condensation water droplets (not shown). The condensation water droplets can drip from the drip edge 62 into the second subspace 24. The inner liner 12 contains a drip edge 88. The drip edge 88 is located at the top wall 48 of the inner liner 12. The drip edge 88 allows water detachment from the top wall 48 of the inner liner 12.

Figure 5:
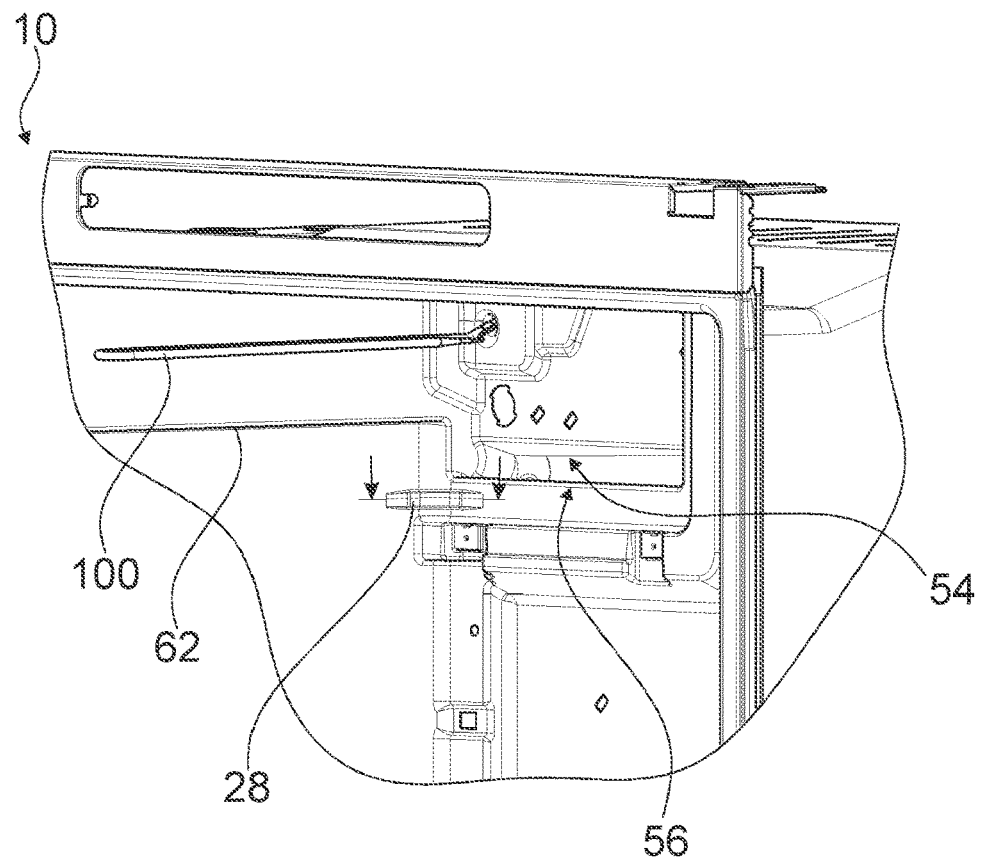
FIG. 5 is a perspective view of a portion of the home appliance device.
Figure 5:
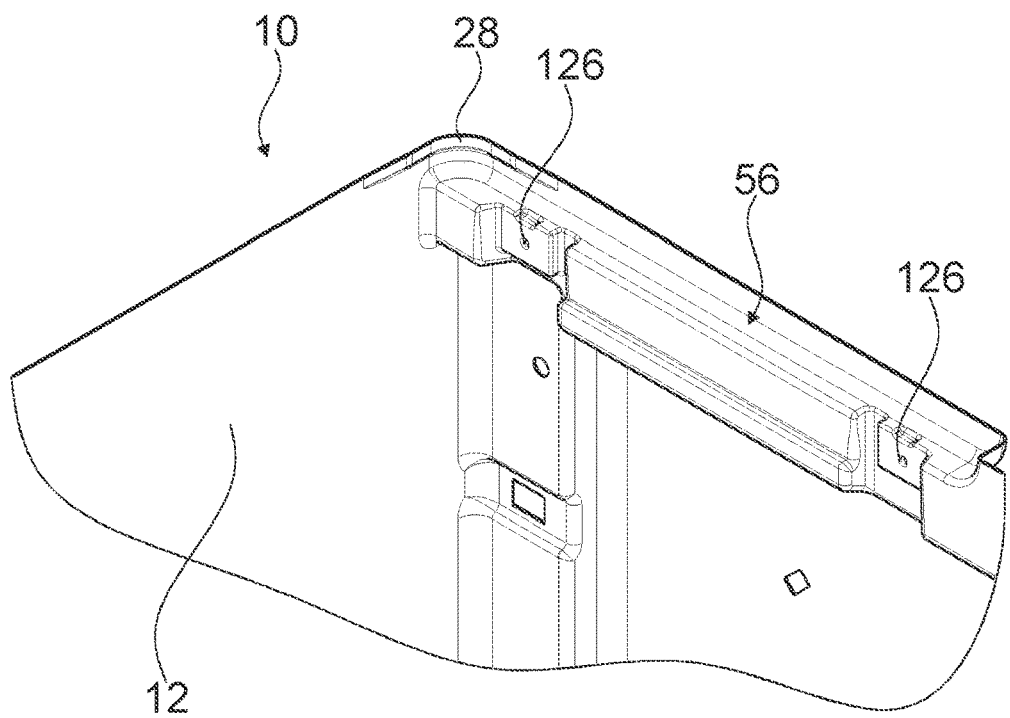

In FIG. 5 two different views of a portion of the home appliance device 10 are shown. It can be seen that the inner liner 12 contains two holes 126. The holes are located underneath the plateau portion 56. In an assembled state the functional unit 16 is connected to the inner liner 12 by means of a bolt connection.

Figure 6:
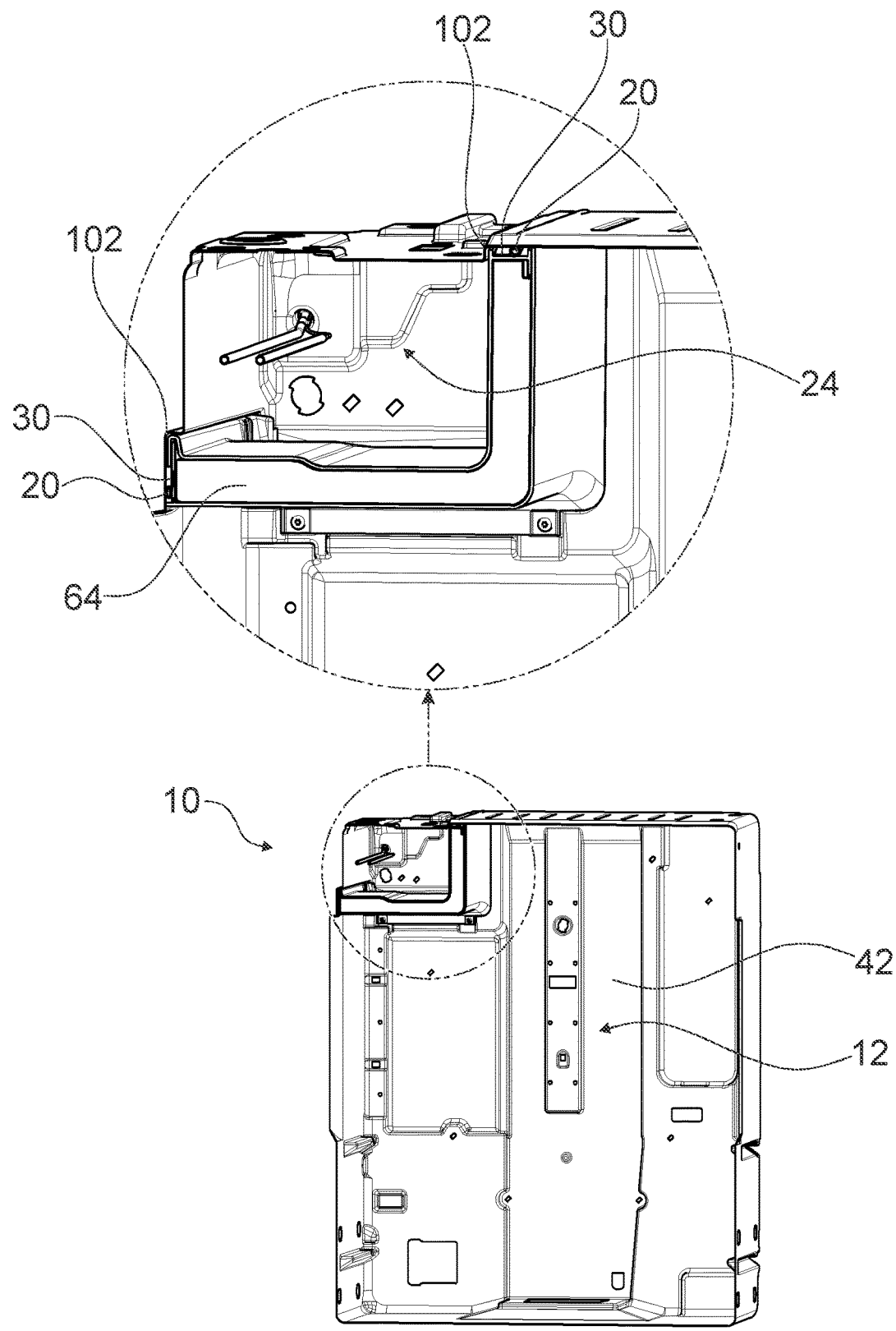
FIG. 6 is a perspective view of a portion of the home appliance device.

FIG. 6 shows a portion of the home appliance device 10 in the assembled state in a partially sectional view, viewed towards the rear wall 42 of the inner liner 12, including a sectional view of the functional unit 16. In the assembled state the functional unit 16 compresses the seal 20 with an evenly distributed pressure force (not shown). Further it is obvious from FIG. 6 that a degree of compression of the seal 20 is delimited by a geometrical shape 102 of the inner liner 12 and by a geometrical shape of the mating surface 30 of the functional unit 16 within a defined range. In particular, the degree of compression is delimited to 50% of a maximally possible compression of the seal 20. As can be seen from FIG. 6, the functional unit 16 abuts on the drip edge 62 in the assembled state.

Figure 7:
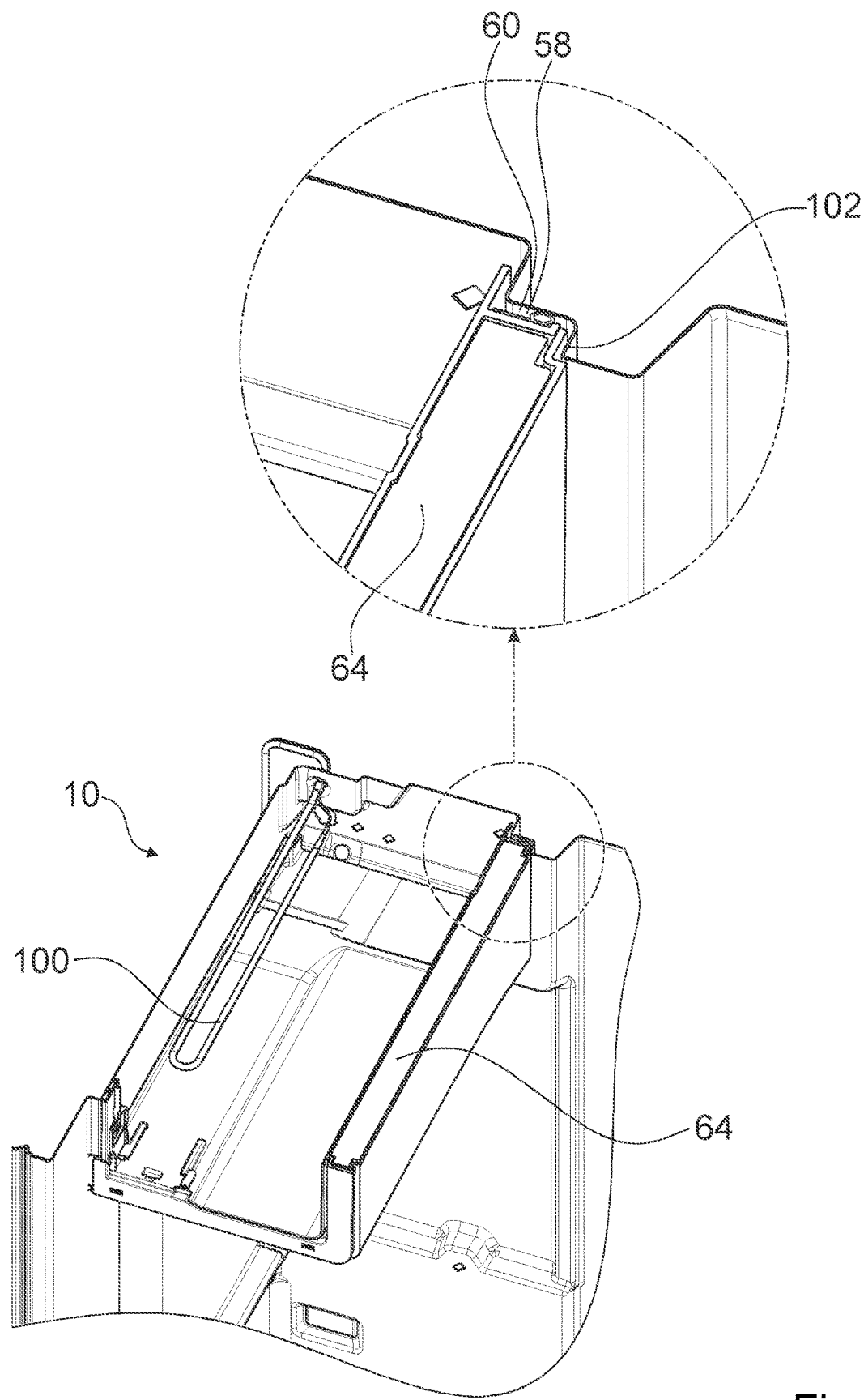
FIG. 7 is a perspective view of a portion of the home appliance device.

FIG. 7 shows a portion of the home appliance device 10 in the assembled state in a partially sectional view looking from a direction of the top wall 48 of the inner liner 12, including a sectional view of the functional unit 16. FIG. 7 illustrates that, in the assembled state, the accommodation element 52 and the functional unit 16 form a gap 58. The gap 58 contains a stationary air cushion 60. The stationary air cushion 60 provides a thermal barrier between the first subspace 22 and the second subspace 24.

Figure 8:
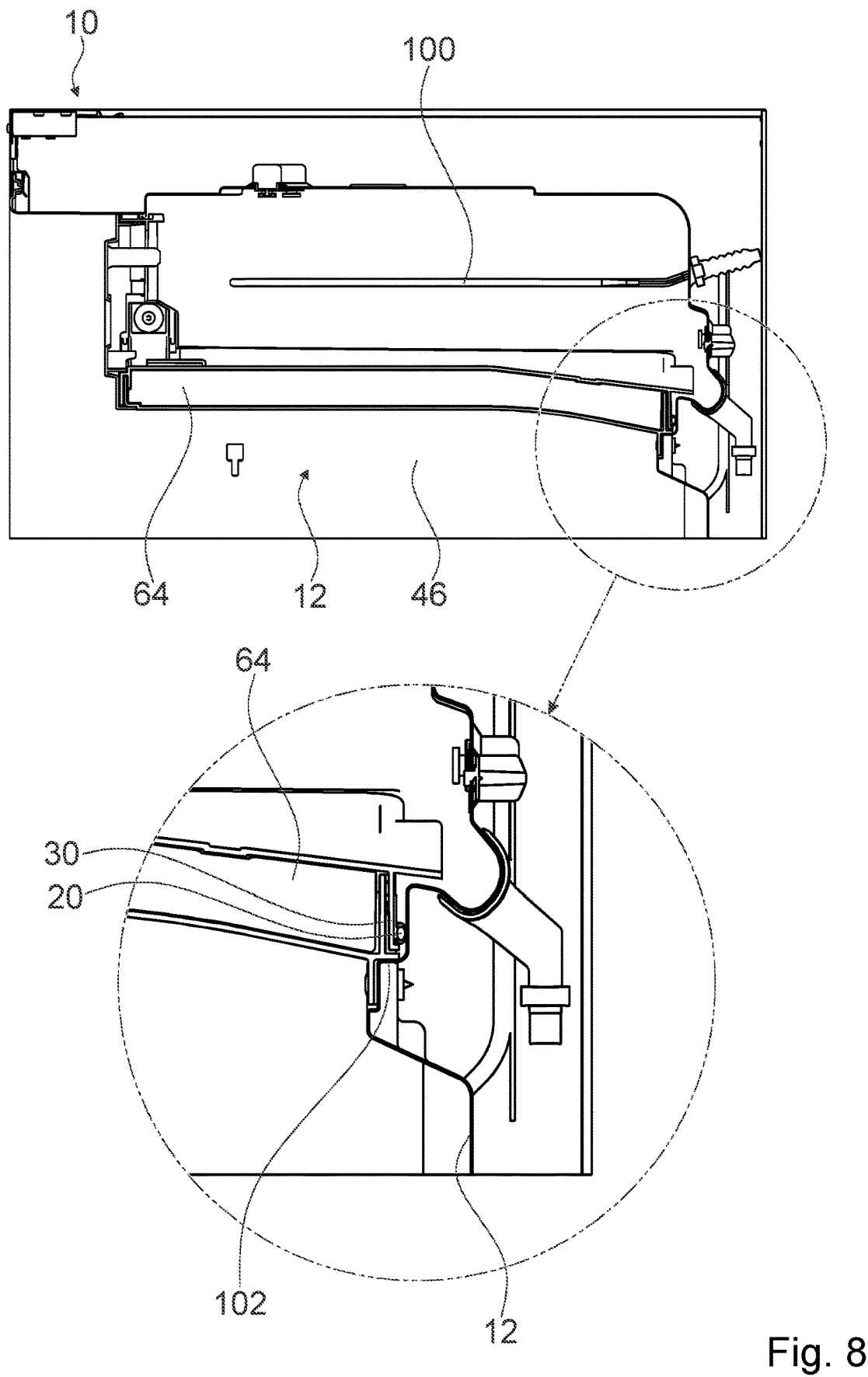
FIG. 8 is a perspective view of a portion of the home appliance device.

FIG. 8 shows a portion of the home appliance device 10 in the assembled state in a partially sectional view looking in a direction to the side wall 46 of the inner liner 12, including a sectional view of the functional unit 16. FIG. 8 also shows that a degree of compression of the seal 20 is delimited within a defined range by the geometrical shape 102 of the inner liner 12 and by the geometrical shape of the mating surface 30 of the functional unit 16.

Figure 9A:
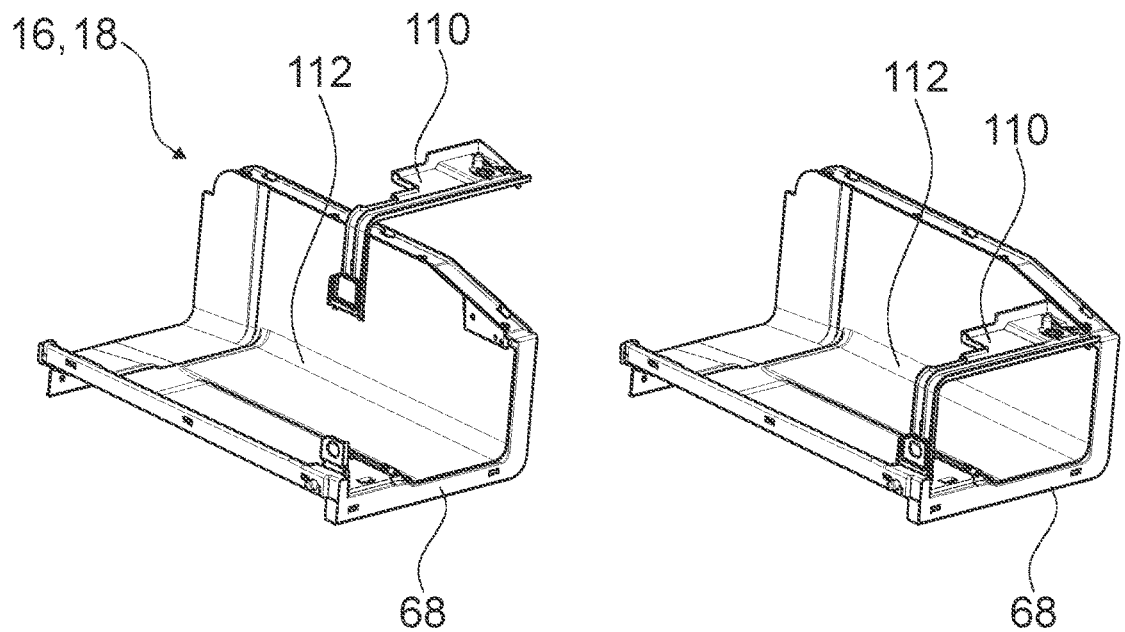
FIG. 9A is a perspective view of a portion of the functional unit embodied as a partitioning unit.
Figure 9B:
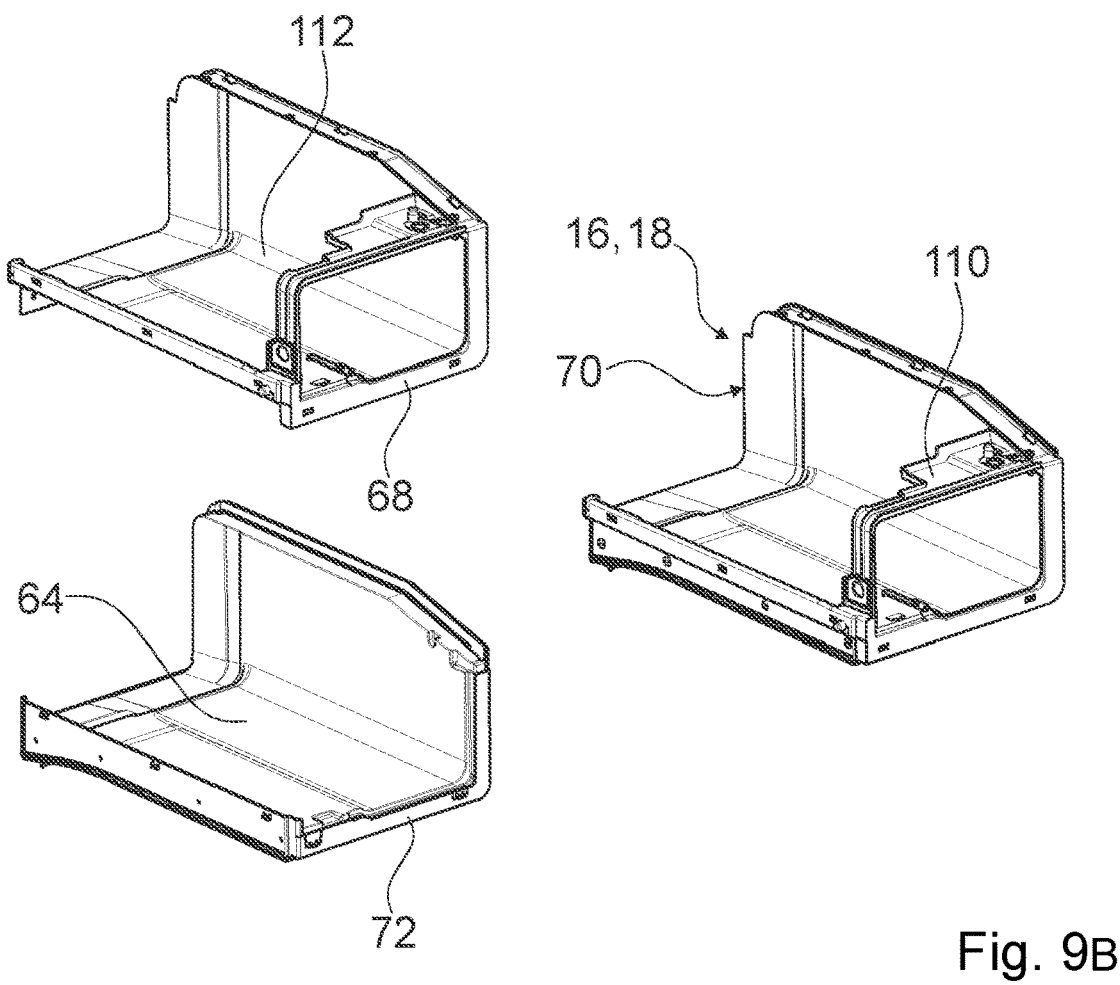
FIG. 9B is a perspective view of the partitioning unit having a housing element.
Figure 9C:
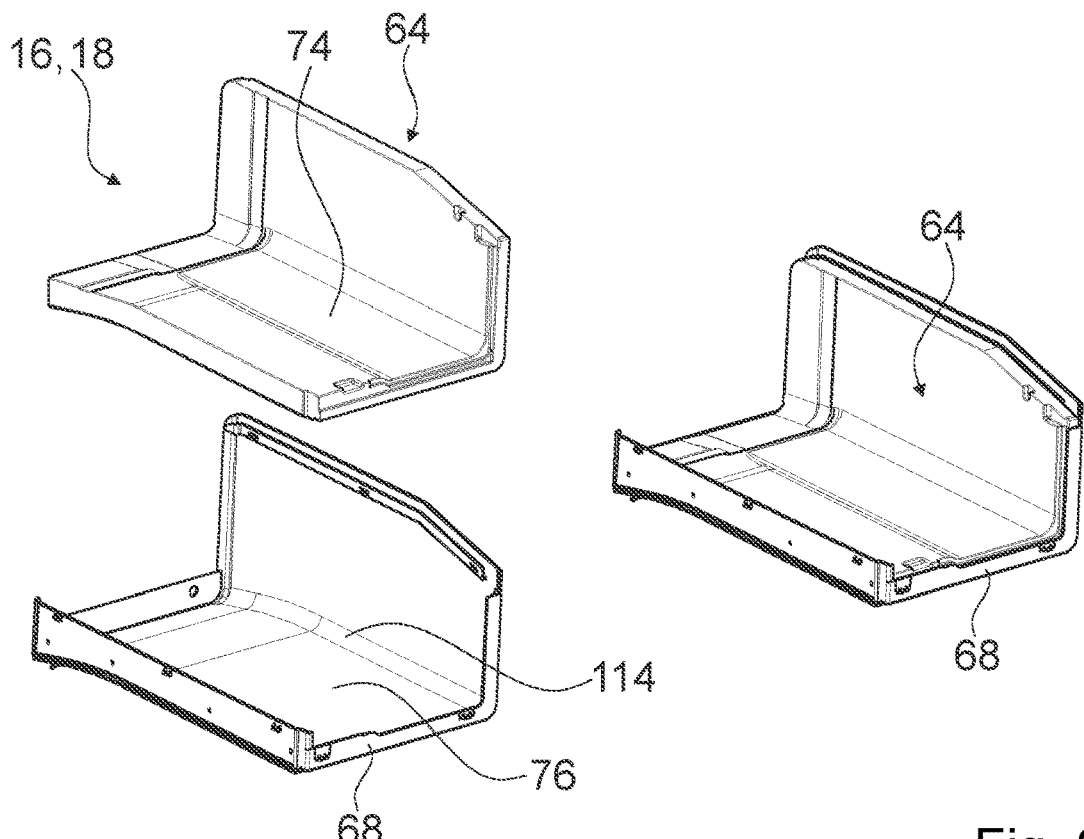
FIG. 9C is a perspective view of the partitioning unit with a thermal insulation element.
Figure 9D:
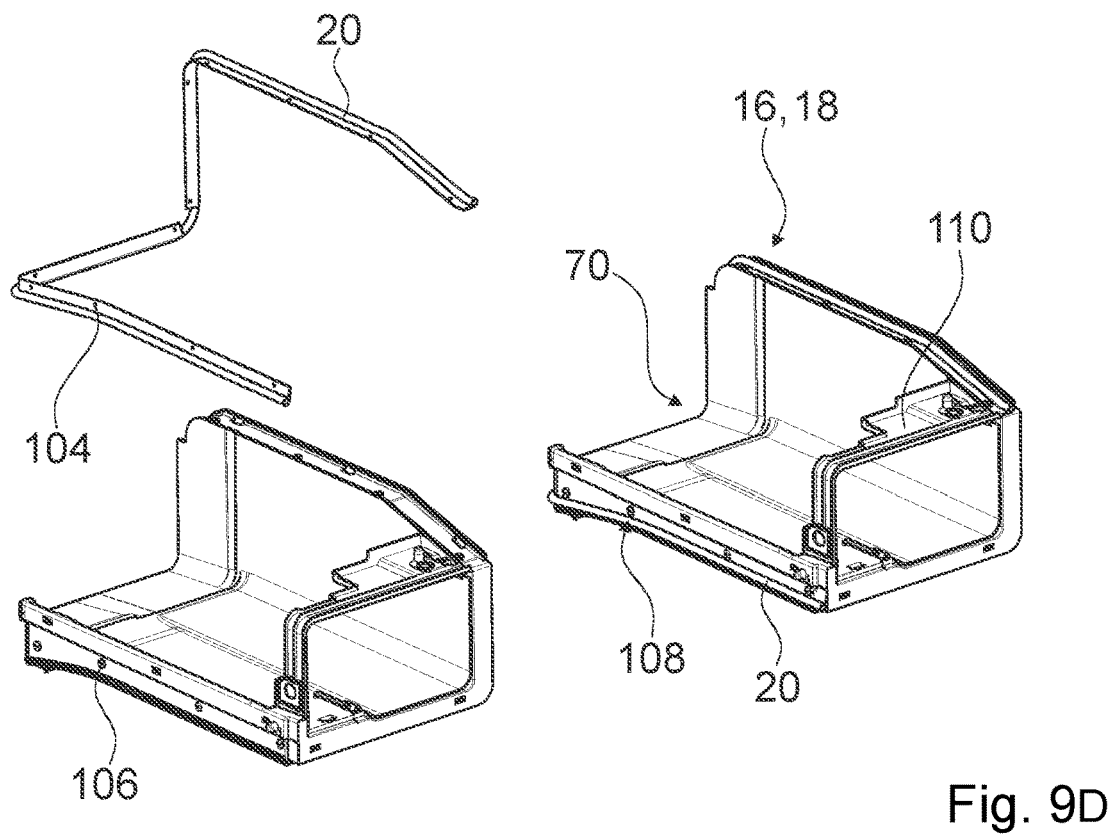
FIG. 9D is a perspective view of the partitioning unit with a seal.

In FIGS. 9A to 9D the functional unit 16 that is embodied as the partitioning unit 18 is shown in several views. The partitioning unit 18 contains a housing element 68 shown in FIG. 9A. The partitioning unit 18 contains a frame element 110. In an assembled state the frame element 110 is attached to the housing element 68. The housing element 68 contains a bend 112. The partitioning unit comprises a housing element 72 shown in FIG. 9B. In an assembled state the housing element 68 and the housing element 72 co-operate and in combination form an outer housing 70 of the partitioning unit 18. The housing elements 68, 72 comprise a bend 114. The partitioning unit 18 contains a thermal insulation inlay element 64, which is shown in FIG. 9C. The thermal insulation inlay element 64 is in an assembled state arranged between the housing element 68 and the housing element 72 of the outer housing 70 of the partitioning unit 18. In the assembled state the housing 70 completely covers the thermal insulation inlay element 64. An outer shape 74 of the thermal insulation inlay element 64 adopts an inner shape 76 of the housing elements 68. The outer shape 74 of the thermal insulation inlay element 64 contains a bend 116. The thermal insulation element 64 contains foamed plastic. In the case shown the thermal insulation inlay element 64 in particular consists of foamed polyurethane plastic. The thermal insulation inlay element 64 is enclosed by a protective foil 66 (compare FIG. 10). FIG. 9D shows the seal 20. The seal 20 is attached to the partitioning unit 18 by means of a latch mechanism 108. The seal 20 contains several latch holes 104. The housing 70 of the partitioning unit 18 contains a plurality of latch pins 106. To attach the seal 20 to the partitioning unit 18, each of the latch pins 106 of the housing is put through a corresponding latch hole 104 of the seal 20.

Figure 10:
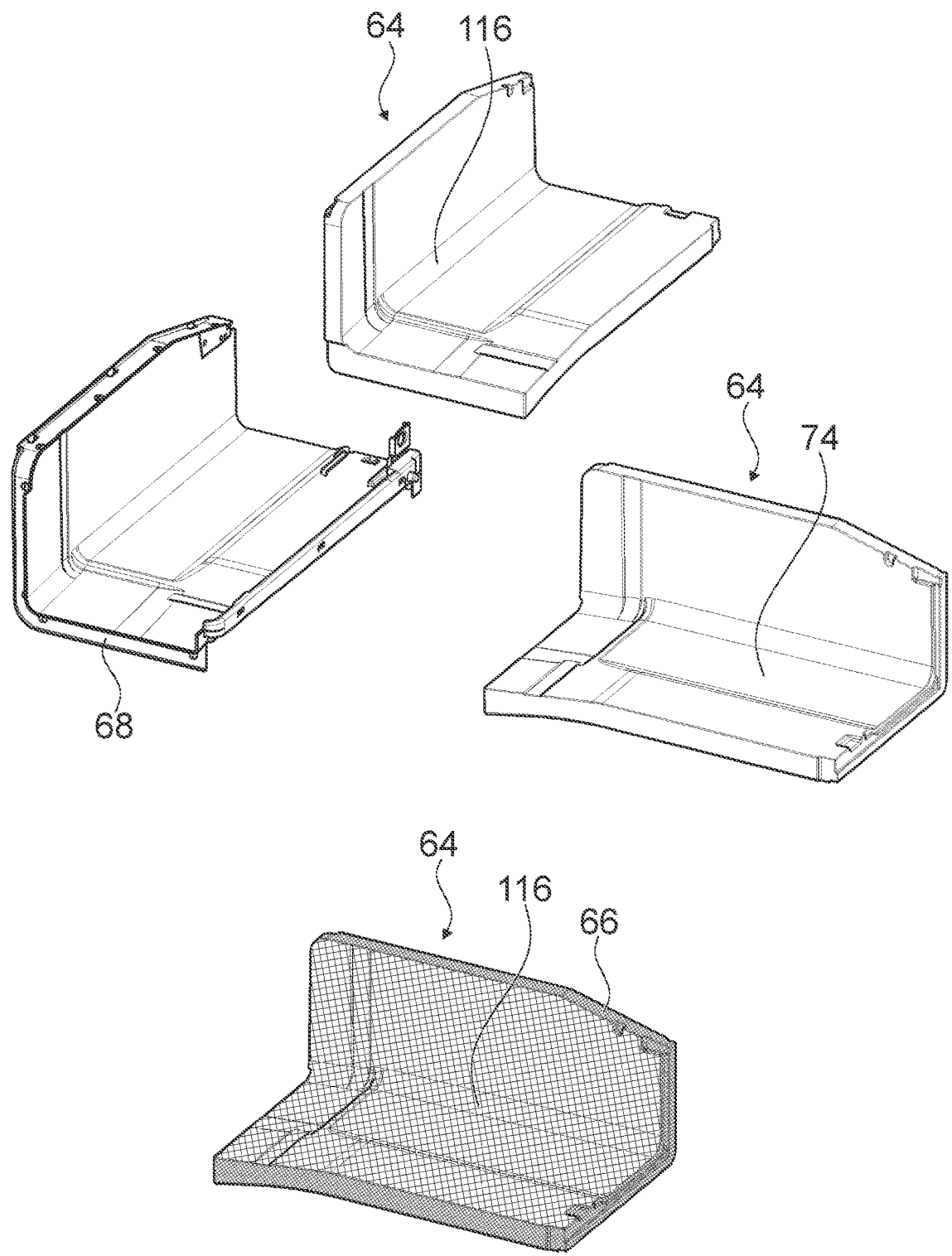
FIG. 10 is a perspective view of the thermal insulation element enclosed by a protective foil.

FIG. 10 shows the thermal insulation inlay element 64 enclosed by the protective foil 66. The protective foil 66 is illustrated by a checkered pattern. The thermal insulation inlay element 64 is enclosed watertightly by the protective foil 66. The protective foil 66 contains synthetic material. In the case shown the protective foil 66 in particular consists of synthetic material, more particular the protective foil 66 consists of polyethylene.

Figure 11:
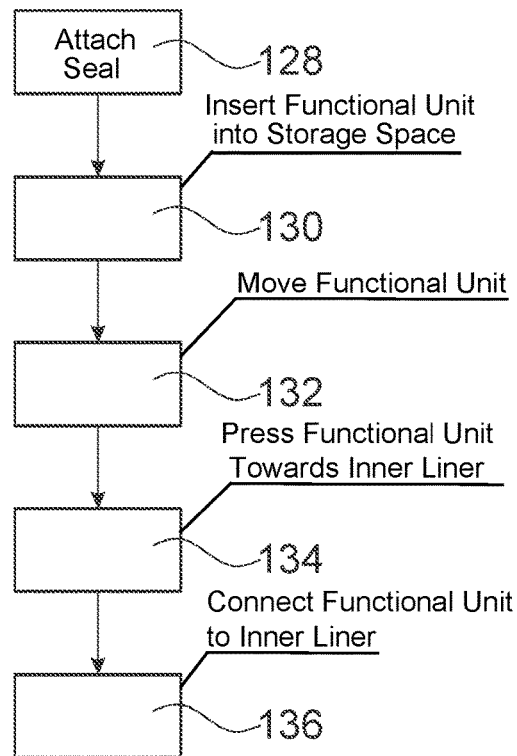
FIG. 11 is a flow diagram of a method for assembling the home appliance device.

In FIG. 11 a diagram is shown illustrating a method for an assembly of the home appliance device 10. The method contains a first step 128. In the first step 128 the seal 20 is attached to the functional unit 16 (compare FIG. 9D). The method includes a second step 130 following the first step 128. In the second step 130 the functional unit 16 is inserted into the storage space 14 of the inner liner 12. The method includes a third step 132 following the second step 130. In the third step 132 the functional unit 16 is moved towards the accommodation element 52 of the inner liner 12, such that the accommodation element 52 accommodates the functional unit 16. The method includes a fourth step 134. The fourth step partly overlaps, in terms of time, with the third step 132. In the fourth step 134 the functional unit 16 is pressed towards the inner liner 12, as a result of which the seal 20 is compressed between the inner liner 12 and the mating surface 30 of the functional unit 16 in such a way that the seal abuts on the protrusion 26 and on the protrusion 28. The method contains a fifth step 136 following the fourth step 134. The fifth step 136 is configured to connect the functional unit 16 to the inner liner 12.

Figures 12A, 12B:
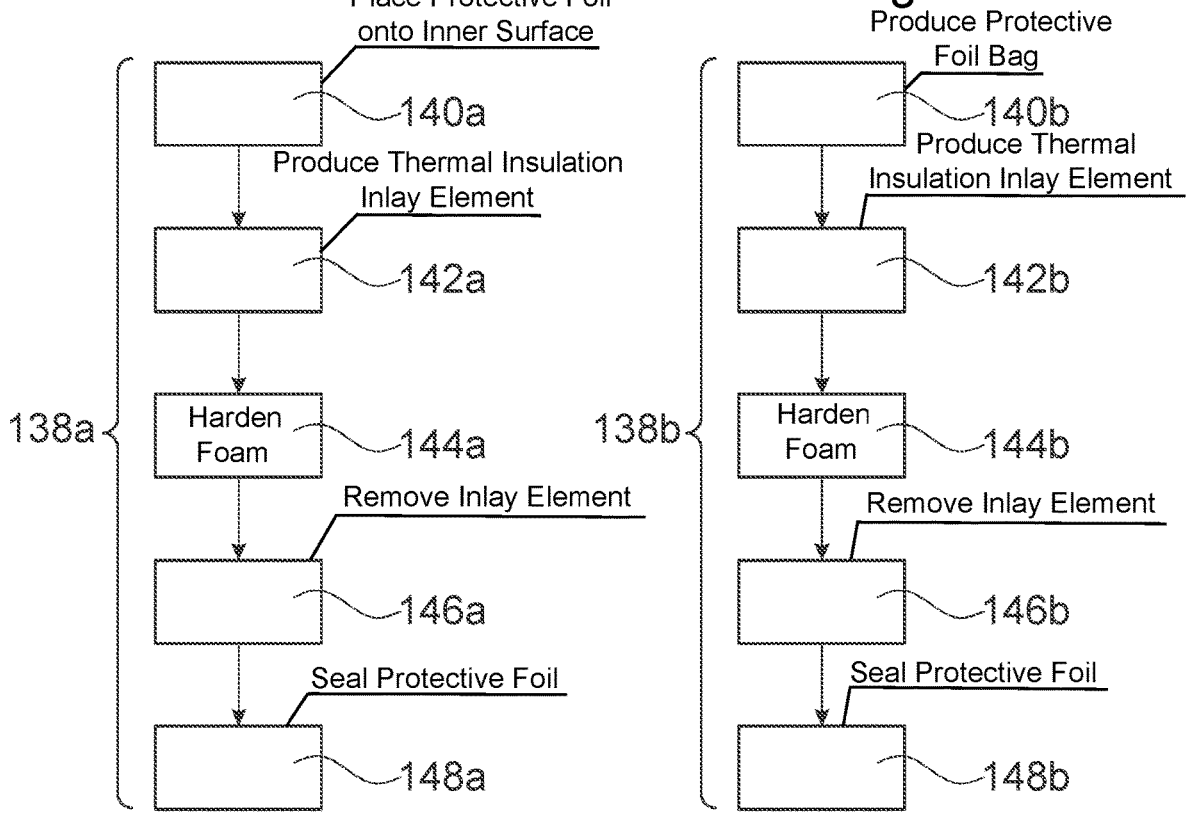
FIG. 12A is a flow diagram of a method of manufacturing the home appliance device, containing a step of enclosing the thermal insulation element.
FIG. 12B is a flow diagram of a method of manufacturing the home appliance device, containing an alternative step of enclosing the thermal insulation element.

FIG. 12A and FIG. 12B show a method of manufacturing a home appliance device 10, the method comprising a step of enclosing 138 of the thermal insulation inlay element 64 by the protective foil 66. FIG. 12A shows a first alternative of the step of enclosing 138a. The step of enclosing 138a contains several partial steps. In a first partial step 140a at least a portion of the protective foil 66 is placed onto an inner surface of a foaming-mold (not shown). In a second partial step 142a the thermal insulation inlay element 64 is produced by filling the foaming-mold with a foam (not shown). In a third partial step 144a the foam hardens inside the foaming-mold. In a fourth partial step 146a the thermal insulation inlay element 64 is removed out of the foaming-mold. In a fifth partial step 148a the protective foil 66 is sealed around the thermal insulation inlay element 64.

FIG. 12B shows a second alternative of the step of enclosing 138b. The step of enclosing 138b contains several partial steps. In a first partial step 140b a protective foil bag (not shown) is produced from the protective foil 66 and is then placed onto a foaming-mold (not shown). In a second partial step 142b the thermal insulation inlay element 64 is produced by filling the protective foil bag inside the foaming-mold with foam. In a third partial step 144b the foam hardens inside the protective foil bag inside the foaming-mold. In a fourth partial step 146b the thermal insulation inlay element 64 is removed out of the foaming-mold. In a fifth partial step 148a the protective foil bag is sealed around the thermal insulation inlay element 64.

The following is a summary list of reference numerals and the corresponding structure used in the above description of the invention:

10 home appliance device
12 inner liner
14 storage space
16 functional unit
18 partitioning unit
20 seal
22 first subspace
24 second subspace
26 protrusion
28 protrusion
30 mating surface
32 edge
34 edge
36 abutment surface
38 first inner liner wall
40 second inner liner wall
42 rear wall of the inner liner
44 second inner liner wall
46 side wall of the inner liner
48 top wall of the inner liner
50 home appliance
52 accommodation element
54 channel
56 plateau portion
58 gap
60 stationary air cushion
62 drip edge
64 thermal insulation inlay element
66 protective foil
68 housing element
70 outer housing
72 housing element
74 outer shape
76 inner shape
78 inner liner
80 storage space
82 functional unit
84 cooling unit
86 abutment surface
88 drip edge
90 bending radius
92 bending radius
94 protrusion
96 protrusion
98 edge
100 coolant pipe
102 geometrical shape
104 latch hole
106 latch pin 108 latch mechanism
110 frame element
112 bend
114 bend
116 bend
118 left upper door
120 right upper door
122 door
124 ice/water dispenser
126 hole
128 first step
130 second step
132 third step
134 fourth step
136 fifth step
138 step of enclosing
140 first partial step
142 second partial step
144 third partial step
146 fourth partial step
148 fifth partial step
150 edge region
152 edge region

The invention claimed is:

1. A home appliance device, comprising:
at least one inner liner defining at least one storage space;
at least one functional unit which in an assembled state is connected to said at least one inner liner and is disposed in said storage space, said at least one functional unit having at least one mating surface;
at least one seal, which in an assembled state is compressed between said at least one mating surface of said at least one functional unit and said at least one inner liner; and
said at least one inner liner having at least one protrusion, said at least one seal abutting on said at least one protrusion in the assembled state, wherein said at least one protrusion having at least one abutment surface for an abutment of said at least one seal, said at least one abutment surface defining a bending radius for said at least one seal which is greater than a bending radius of an edge region of said at least one inner liner.

2. The home appliance device according to claim 1, wherein said at least one functional unit being a partitioning unit that partitions said storage space into at least two subspaces in the assembled state.

3. The home appliance device according to claim 1, wherein said at least one functional unit is a cooling unit for reducing humidity inside said storage space.

4. The home appliance device according to claim 3, wherein said cooling unit is a no-frost cooling unit.

5. The home appliance device according to claim 1, wherein said at least one inner liner having an edge and said at least one protrusion is disposed at said edge of said at least one inner liner.

6. The home appliance device according to claim 1, wherein:
said at least one inner liner having an inner liner wall; and
said at least one protrusion being implemented integrally with said inner liner wall of said at least one inner liner.

7. The home appliance device according to claim 1, wherein said at least one functional unit compressing said at least one seal with an evenly distributed pressure force in the assembled state.

8. The home appliance device according to claim 1, wherein a geometrical shape of said at least one inner liner and/or of said mating surface delimiting a degree of compression of said at least one seal within a defined range in the assembled state.

9. The home appliance device according to claim 1, wherein said at least one inner liner having a first inner liner wall and a second inner liner wall, said at least one protrusion being disposed at said edge region of said at least one inner liner and extending from said first inner liner wall to said second inner liner wall.

10. The home appliance device according to claim 9, wherein said first inner liner wall being a rear wall of said at least one inner liner.

11. The home appliance device according to claim 9, wherein said second inner liner wall being a side wall of said at least one inner liner.

12. The home appliance device according to claim 9, wherein said second inner liner wall being a top wall of said at least one inner liner.

13. The home appliance device according to claim 1, wherein said at least one functional unit is detachably connected to said at least one inner liner.

14. The home appliance device according to claim 1, further comprising a latching mechanism, said at least one seal being mounted on said at least one functional unit by means of said latch mechanism.

15. The home appliance device according to claim 1, the home appliance device is a home refrigeration appliance device.

16. A home appliance, comprising:
at least one home appliance device, containing:
at least one inner liner defining at least one storage space;
at least one functional unit which in an assembled state is connected to said at least one inner liner and is disposed in said storage space, said at least one functional unit having at least one mating surface; and
at least one seal, which in an assembled state is compressed between said at least one mating surface of said functional unit and said at least one inner liner; and
said at least one inner liner having at least one protrusion, and said at least one seal abutting on said protrusion in the assembled state, wherein said at least one protrusion having at least one abutment surface for an abutment of said at least one seal, said at least one abutment surface defining a bending radius for said at least one seal which is greater than a bending radius of an edge region of said at least one inner liner.

17. A method for assembling a home appliance device, which comprises the steps of:
attaching at least one seal to at least one functional unit;
inserting the at least one functional unit into a storage space of an inner liner;
pressing the at least one functional unit towards the inner liner, thereby compressing the at least one seal between at least one mating surface of the functional unit and the inner liner such that the at least one seal abuts on at least one protrusion of the inner liner, wherein the at least one protrusion having at least one abutment surface for an abutment of the at least one seal, the at least one abutment surface defining a bending radius for the at least one seal which is greater than a bending radius of an edge region of said at least one inner liner; and connecting the at least one functional unit to the inner liner.

\* \* \* \* \*